(12) United States Patent
Tukada

(10) Patent No.: US 11,594,248 B1
(45) Date of Patent: Feb. 28, 2023

(54) DISK DEVICE HAVING RAMP THAT INCLUDES PROTRUSION

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Sinji Tukada, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 17/692,009

(22) Filed: Mar. 10, 2022

(30) Foreign Application Priority Data

Sep. 22, 2021 (JP) .............................. JP2021-154721

(51) Int. Cl.
    *G11B 5/48*           (2006.01)
    *G11B 5/54*           (2006.01)

(52) U.S. Cl.
    CPC .............. *G11B 5/4826* (2013.01); *G11B 5/54* (2013.01); *G11B 5/4833* (2013.01)

(58) Field of Classification Search
    CPC ........ G11B 5/54; G11B 5/4826; G11B 5/4833
    See application file for complete search history.

(56) References Cited

U.S. PATENT DOCUMENTS

| | | | | |
|---|---|---|---|---|
| 6,067,209 | A * | 5/2000 | Aoyagi ..................... | G11B 5/54 |
| 6,078,474 | A * | 6/2000 | Koyanagi .............. | G11B 21/22 |
| 6,414,821 | B1 * | 7/2002 | Tokuyama ........... | G11B 5/6005 |
| 6,452,753 | B1 * | 9/2002 | Hiller ........................ | G11B 5/54 |
| 6,487,051 | B1 * | 11/2002 | Koyanagi ................ | G11B 5/54 |
| 7,564,653 | B2 * | 7/2009 | Ohta ......................... | G11B 5/40 |
| | | | | 360/254.7 |
| 7,593,192 | B1 * | 9/2009 | Rappel ..................... | G11B 5/54 |
| | | | | 360/255 |
| 7,768,745 | B2 * | 8/2010 | Okada ...................... | G11B 5/54 |
| | | | | 360/254.8 |
| 7,813,078 | B1 * | 10/2010 | Gleason ............... | G11B 25/043 |
| | | | | 360/97.13 |
| 7,885,040 | B2 * | 2/2011 | Yang .................... | G11B 5/4826 |
| | | | | 360/254.8 |

(Continued)

*Primary Examiner* — Brian E Miller
(74) *Attorney, Agent, or Firm* — Kim & Stewart LLP

(57) ABSTRACT

The disk device according to one embodiment includes magnetic disks, a magnetic head, a ramp, and a suspension. The suspension includes a sliding portion provided on a load beam. The suspension rotates about a second rotation axis between a load position and an unload position. The ramp includes a wall and a protrusion. The wall has a first support surface that supports the sliding portion when the suspension is located in the unload position. The protrusion includes a second support surface and an intermediate portion. The second support surface faces the magnetic head when the suspension is located in the unload position. The intermediate portion is located between the wall and the second support surface. The intermediate portion includes a first portion and a second portion. The second portion is located between the first portion and the first support surface in the radial direction of the second rotation axis.

11 Claims, 4 Drawing Sheets

(56) References Cited

U.S. PATENT DOCUMENTS

| | | | |
|---|---|---|---|
| 7,986,496 B2 * | 7/2011 | Ohta | G11B 21/22 360/254.8 |
| 8,199,439 B2 | 6/2012 | Huang et al. | |
| 8,493,690 B1 * | 7/2013 | Ono | G11B 21/22 360/254.8 |
| 9,171,560 B1 | 10/2015 | Davidson et al. | |
| 9,183,862 B1 * | 11/2015 | Shah | G11B 5/4806 |
| 9,196,275 B1 | 11/2015 | Davidson et al. | |
| 9,390,736 B1 * | 7/2016 | Davidson | G11B 5/483 |
| 9,536,552 B1 * | 1/2017 | Chen | G11B 21/22 |
| 2001/0015875 A1 * | 8/2001 | Ohta | G11B 5/54 |
| 2002/0044386 A1 * | 4/2002 | Koyanagi | G11B 21/22 |
| 2002/0186510 A1 * | 12/2002 | Feliss | G11B 5/54 |
| 2005/0207066 A1 * | 9/2005 | Kobayashi | G11B 21/22 |
| 2005/0213254 A1 * | 9/2005 | Okutomi | G11B 5/54 |
| 2005/0237671 A1 * | 10/2005 | Nguyen | G11B 5/54 |
| 2006/0256478 A1 * | 11/2006 | Hayakawa | G11B 21/22 |
| 2007/0008653 A1 * | 1/2007 | Ohno | G11B 5/54 |
| 2007/0206330 A1 * | 9/2007 | Deguchi | G11B 5/54 |
| 2007/0206331 A1 * | 9/2007 | Deguchi | G11B 5/54 |
| 2008/0037176 A1 * | 2/2008 | Matsuda | G11B 5/54 |
| 2008/0074796 A1 * | 3/2008 | Shimizu | G11B 21/22 360/254.7 |
| 2008/0204925 A1 * | 8/2008 | Ohta | G11B 21/12 |
| 2008/0285175 A1 * | 11/2008 | Okutomi | G11B 21/22 360/254.8 |
| 2009/0303637 A1 * | 12/2009 | Larson | G11B 5/54 360/254.8 |
| 2014/0126084 A1 * | 5/2014 | Nakamiya | G11B 21/22 360/97.12 |
| 2020/0027477 A1 * | 1/2020 | Garbarino | G11B 5/56 |

* cited by examiner

DISK DEVICE HAVING RAMP THAT INCLUDES PROTRUSION

CROSS-REFERENCE TO RELATED APPLICATIONS

This application is based upon and claims the benefit of priority from Japanese Patent Application No. 2021-154721, filed on Sep. 22, 2021; the entire contents of which are incorporated herein by reference.

FIELD

Embodiments described herein relate generally to a disk device.

BACKGROUND

A disk device such as a hard disk drive (HDD) includes, for example, magnetic disks, magnetic heads, suspensions, and ramp. The magnetic heads are held by the corresponding suspensions. Each suspension rotates between a load position where the magnetic head is located on the surface of the magnetic disk and an unload position where the suspension is held by the ramp.

The ramp has, for example, a wall and protrusions protruding from the wall between two magnetic heads in the unload position. Each of the protrusions serves to restrict the two magnetic heads from coming into contact with each other.

As the number of magnetic disks increases in the disk device, the interval at which adjacent magnetic disks are arranged generally decreases. Each of the protrusions may be set to a thinner thickness according to the decreased interval, which may cause difficulty in manufacturing the ramp.

DETAILED DESCRIPTION

Figure 1:
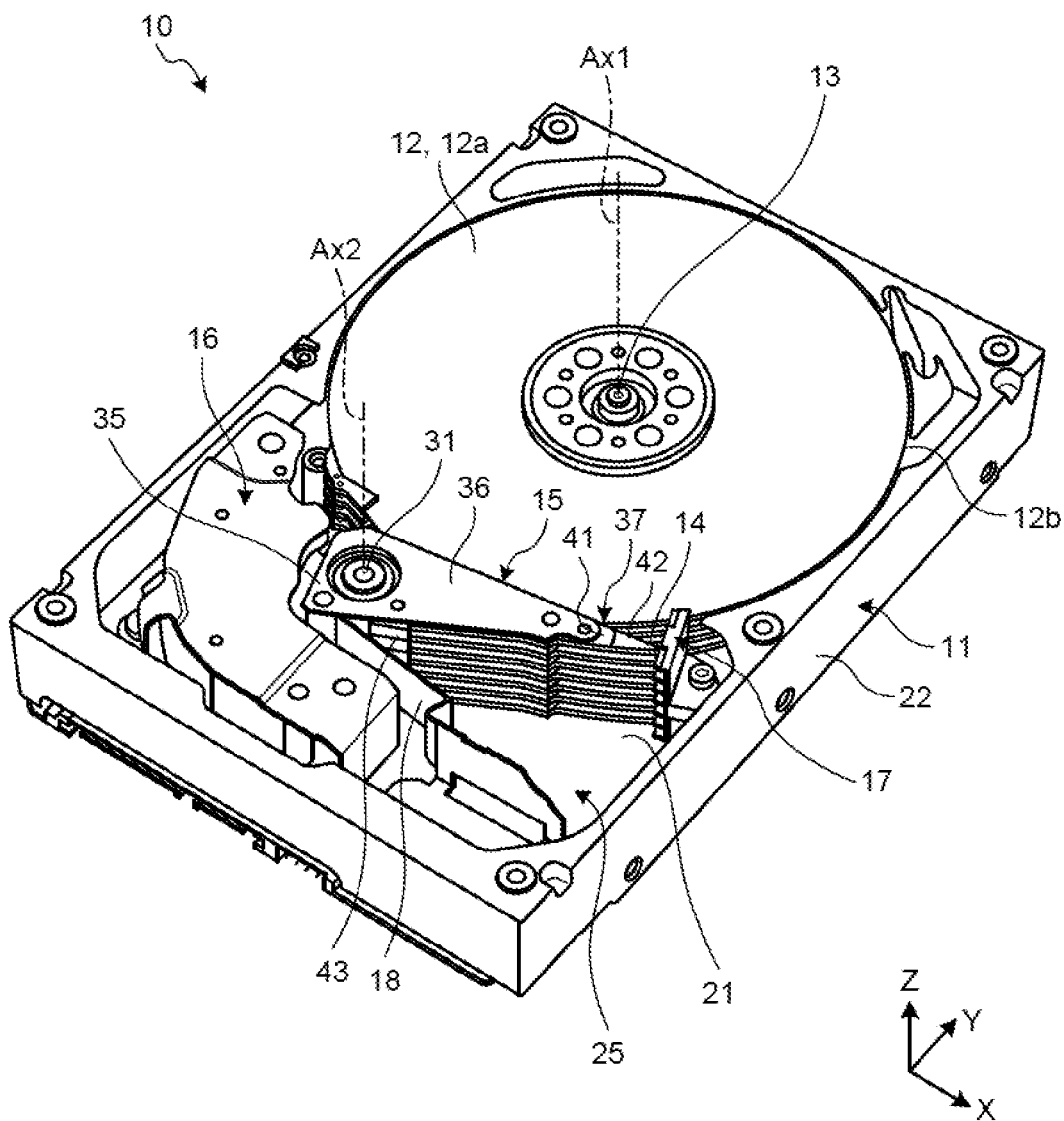
FIG. 1 is an exemplary perspective diagram illustrating a hard disk drive (HDD) according to one embodiment.

The disk device according to one embodiment includes a plurality of magnetic disks, a magnetic head, a ramp, and a suspension. Each of the magnetic disks has a recording surface and is rotatable about a first rotation axis that intersects the recording surface. The magnetic head is configured to read and write information to and from the recording surface. The ramp is placed apart from the first rotation axis. The suspension includes a load beam, a sliding portion, a flexure and a holder. The load beam extends in a radial direction of a second rotation axis. The sliding portion is provided at an end of the load beam in a radially outward direction of the second rotation axis. The flexure is attached to the load beam. The holder is placed on the flexure between the sliding portion and the second rotation axis in the radial direction of the second rotation axis, to hold the magnetic head. The suspension is configured to rotate about the second rotation axis between a load position and an unload position. The load position is a position where the sliding portion is apart from the ramp and the magnetic head is located on the recording surface. The unload position is a position where the sliding portion is held by the ramp. The ramp includes a wall and a protrusion protruding inward from the wall in the radial direction of the second rotation axis. The wall has a first support surface that supports the sliding portion when the suspension is located in the unload position. The protrusion includes a second support surface and an intermediate portion. The second support surface is apart from the first support surface in an axial direction of the first rotation axis and facing the magnetic head when the suspension is located in the unload position. The intermediate portion is located between the wall and the second support surface in the radial direction of the second rotation axis. When the suspension is located in the unload position, in the axial direction of the first rotation axis a distance between an end of the flexure in the radially outward direction of the second rotation axis and the protrusion is longer than a distance between the magnetic head and the second support surface. The intermediate portion includes a first portion and a second portion. The first portion is located between the first support surface and the second support surface in the axial direction of the first rotation axis. The second portion is located between the first portion and the first support surface in the axial direction of the first rotation axis and in the radial direction of the second rotation axis.

Hereinafter, one embodiment will be described with reference to FIGS. 1 to 4. Note that, in this specification, the component elements according to the embodiment and the description of the elements may be described in a plurality of expressions. The component elements and their descriptions are examples and are not limited by the expressions of the specification. The component elements may also be identified by names different from those in the specification. Further, the component elements may also be described by expressions different from those in the specification.

FIG. 1 is an exemplary perspective diagram illustrating a hard disk drive (HDD) 10 according to one embodiment. The HDD 10 is an example of a disk device, and may also be referred to as an electronic device, a storage device, an external storage device, or a magnetic disk device.

As illustrated in each drawing, X-axis, Y-axis and Z-axis are defined in this disclosure for the sake of convenience. The X-axis, Y-axis, and Z-axis are orthogonal to one another. The X-axis is along the width of the HDD 10. The Y-axis is along the length of the HDD 10. The Z-axis is along the thickness of the HDD 10.

Furthermore, in this disclosure, X direction, Y direction, and Z direction are defined. The X direction is a direction along the X-axis and includes a +X direction indicated by the X-axis arrow and a −X direction opposite to the X-axis arrow. The Y direction is a direction along the Y-axis and includes a +Y direction indicated by the Y-axis arrow and a −Y direction opposite to the Y-axis arrow. The Z direction is a direction along the Z-axis and includes a +Z direction indicated by the Z-axis arrow and a −Z direction opposite to the Z-axis arrow.

As illustrated in FIG. 1, the HDD 10 includes a housing 11, a plurality of magnetic disks 12, a spindle motor 13, a plurality of magnetic heads 14, an actuator assembly 15, a voice coil motor (VCM) 16, and a ramp load mechanism 17, and a flexible printed circuit board (FPC) 18. The magnetic heads 14 may also be referred to as sliders.

The housing 11 extends in the Y direction and has a substantially rectangular parallelepiped box shape open in the +Z direction. The housing 11 has a bottom wall 21 and a peripheral wall 22. The bottom wall 21 has a substantially rectangular (quadrangular) plate shape extending along the X-Y plane. The peripheral wall 22 protrudes in substantially the +Z direction from the edge of the bottom wall 21 and has a substantially rectangular frame shape. The bottom wall 21 and the peripheral wall 22 are integrally made of a metal material such as an aluminum alloy.

The housing 11 has an inner chamber 25 open in the +Z direction. The inner chamber 25 is formed, defined, or partitioned by, for example, the bottom wall 21 and the peripheral wall 22. That is, the peripheral wall 22 surrounds the inner chamber 25. The inner chamber 25 is substantially airtightly closed by, for example, a cover attached to the housing 11.

The inner chamber 25 is filled with a gas different from air. For example, the inner chamber 25 may be filled with a low-density gas having a density lower than air or an inert gas having a low reactivity. In the present embodiment, the inner chamber 25 is filled with helium. Note that the inner chamber 25 may be filled with another fluid. The inner chamber 25 may be maintained at a vacuum, a low pressure close to a vacuum, or a negative pressure lower than the atmospheric pressure.

The plurality of magnetic disks 12 extends along the X-Y plane. The diameter of the magnetic disks 12 can be, for example, set to three to four inches. In the present embodiment, the diameter of the magnetic disks 12 is set to about 3.5 inches, although the diameter of the magnetic disk 12 is not limited to this example. Each of the magnetic disks 12 includes, for example, at least one recording surface 12a and an outer edge 12b.

Each magnetic disk 12 includes the recording surface 12a on at least either the upper surface or the lower surface. In other words, each of the recording surfaces 12a of the magnetic disk 12 faces in substantially the +Z direction or in substantially the −Z direction.

The recording surface 12a is a substantially flat surface extending along the X-Y plane. The recording surface 12a of the magnetic disk 12 includes a magnetic recording layer thereon. Note that part of the recording surface 12a may not include the magnetic recording layer. The outer edge 12b is the outer periphery of the magnetic disk 12.

The magnetic disks 12 are stacked in the Z direction at intervals. The spindle motor 13 includes a hub that supports the magnetic disks 12. The magnetic disks 12 are held on the hub of the spindle motor 13 using, for example, a clamp spring.

Figure 2:
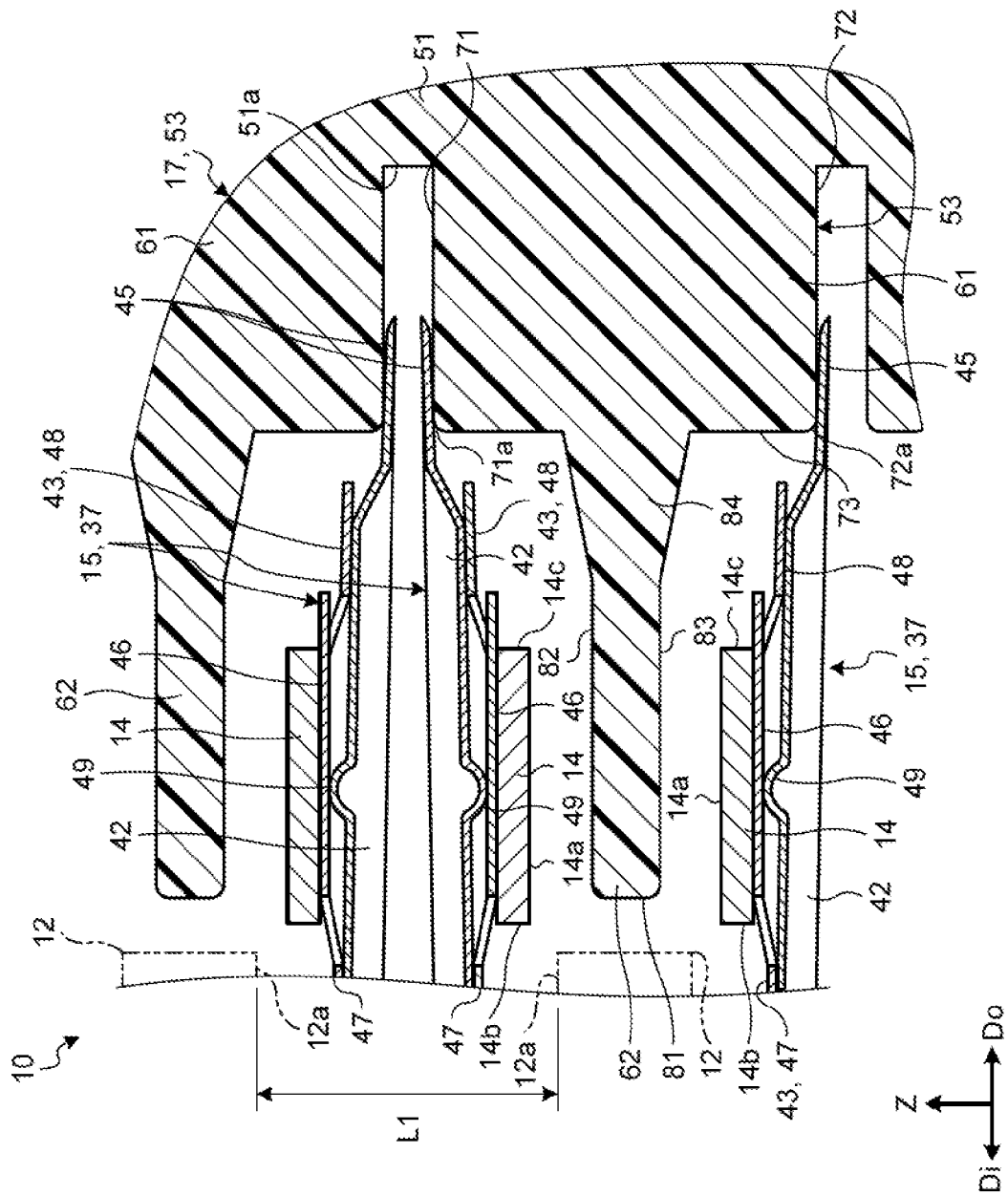
FIG. 2 is an exemplary cross-sectional diagram illustrating a portion of an actuator assembly and a portion of a ramp load mechanism of the above embodiment.

FIG. 2 is an exemplary cross-sectional diagram illustrating a portion of the actuator assembly 15 and a portion of the ramp load mechanism 17 of the present embodiment. In the present embodiment, the HDD 10 includes 10 or more magnetic disks 12. As schematically illustrated in FIG. 2, the magnetic disks 12 can be arranged with an interval L1 being 0 mm or more and 1.482 mm or less. In the present embodiment, the interval L1 is set to about 1.482 mm. Note that the number of the magnetic disks 12 and the interval L1 are not limited to this example.

The spindle motor 13 of FIG. 1 rotates the plurality of magnetic disks 12 about a first rotation axis Ax1. The first rotation axis Ax1 is a virtual axis extending in substantially the Z direction. That is, the first rotation axis Ax1 extends in a direction orthogonal to (intersecting) the recording surface 12a.

The first rotation axis Ax1 corresponds to the center of rotation of the spindle motor 13 and the axis of the magnetic disks 12 and the hub of the spindle motor 13. Note that the axis of the magnetic disks 12 and the axis of the hub of the spindle motor 13 may be different from the center of rotation of the spindle motor 13.

The magnetic heads 14 record and reproduce information on and from the recording surfaces 12a of the magnetic disks 12. In other words, the magnetic heads 14 read and write information to and from the recording surfaces 12a of the magnetic disks 12. The magnetic heads 14 are mounted on the actuator assembly 15.

The actuator assembly 15 is rotatably supported by a support shaft 31 located apart from the magnetic disks 12. The support shaft 31 extends, for example, in substantially the +Z direction from the bottom wall 21 of the housing 11.

The actuator assembly 15 can rotate about a second rotation axis Ax2 away from the first rotation axis Ax1. The second rotation axis Ax2 is a virtual axis extending in substantially the Z direction. Thus, the first rotation axis Ax1 and the second rotation axis Ax2 are substantially in parallel with each other. The second rotation axis Ax2 corresponds to, for example, the center of rotation of the actuator assembly 15 and the axis of the support shaft 31.

In this disclosure, axial direction, radial direction, and circumferential direction are defined. The axial direction is a direction along the virtual axis such as the first rotation axis Ax1 and the second rotation axis Ax2, and includes two opposite directions along the virtual axis. The radial direction is a direction orthogonal to the virtual axis and includes a plurality of directions orthogonal to the virtual axis. The circumferential direction is a direction of rotation about the virtual axis, and includes a clockwise direction and a counterclockwise direction about the virtual axis.

As described above, the first rotation axis Ax1 and the second rotation axis Ax2 extend apart from each other and substantially in parallel in substantially the Z direction. That is, the axial direction of the first rotation axis Ax1 and the axial direction of the second rotation axis Ax2 are the Z direction. The first rotation axis Ax1 is set apart from the second rotation axis Ax2 in the radial direction of the second rotation axis Ax2.

The VCM 16 rotates the actuator assembly 15 about the second rotation axis Ax2 to set the actuator assembly 15 in a desired position. The magnetic head 14 moves to the outermost circumference of the magnetic disk 12 along with the rotation of the actuator assembly 15 by the VCM 16, and then the ramp load mechanism 17 holds the magnetic head 14 apart from the magnetic disk 12.

The actuator assembly 15 includes an actuator block 35, a plurality of arms 36, and a plurality of head suspension assemblies (suspensions) 37. The suspensions 37 may also be referred to as a head gimbal assembly (HGA).

The actuator block 35 is rotatably supported by the support shaft 31 via, for example, a bearing. The plurality of arms 36 protrudes from the actuator block 35 in the radial direction of the second rotation axis Ax2. Note that the actuator assembly 15 may be divided to allow the arms 36 to protrude from the corresponding actuator blocks 35.

The arms 36 are arranged at intervals in the axial direction of the second rotation axis Ax2. Each of the arms 36 has a plate shape that can enter a gap between the adjacent magnetic disks 12. The arms 36 extend substantially in parallel with each other.

The actuator block 35 and the arms 36 are integrally formed of, for example, aluminum. Note that the material of the actuator block 35 and the arms 36 is not limited to this example.

The actuator block 35 is provided with a protrusion protruding oppositely with respect to the arms 36, and the voice coil of the VCM 16 is placed on the protrusion. The VCM 16 includes a pair of yokes, a voice coil placed between the yokes, and a magnet set on the yokes.

As described above, the VCM 16 rotates the actuator assembly 15 about the second rotation axis Ax2. In other words, the VCM 16 rotates (moves) the actuator block 35, the arms 36, and the suspensions 37 together about the second rotation axis Ax2.

The suspensions 37 are attached to the tip portions of the corresponding arms 36 and protrude from the arms 36. Thus, the suspensions 37 are arranged at intervals in the axial direction of the second rotation axis Ax2. Each of the suspensions 37 has a base plate 41, a load beam 42, and a flexure 43.

The base plate 41 and the load beam 42 are made of, for example, stainless steel. Note that the base plate 41 and the load beam 42 may be made of other materials or may be made of different materials.

The base plate 41 is attached to the tip portion of the arm 36. The load beam 42 is attached to the tip portion of the base plate 41 and protrudes from the base plate 41 in the radial direction of the second rotation axis Ax2. In other words, the load beam 42 extends in the radial direction of the second rotation axis Ax2.

The load beam 42 has a plate shape thinner than the base plate 41, extending along the X-Y plane. That is, the load beam 42 is supported by the base plate 41 in a cantilevered manner and is thus bendable at one end attached to the base plate 41 as a fulcrum.

As illustrated in FIG. 2, inward direction Di and outward direction Do are defined. The inward direction Di and the outward direction Do are included in the radial direction. The inward direction Di is an example of radially inward direction of the second rotation axis. The outward direction Do is an example of radially outward direction of the second rotation axis. The inward direction Di is a direction orthogonal to the second rotation axis Ax2 and toward the second rotation axis Ax2. The outward direction Do is opposite to the inward direction Di.

The load beam 42 includes a lift tab 45. The lift tab 45 is an example of a sliding portion. The lift tab 45 is located at the end of the load beam 42 in the outward direction Do. Further, the lift tab 45 is located at the end of the actuator assembly 15 in the outward direction Do. The lift tab 45 is thus apart from the second rotation axis Ax2 in the radial direction of the second rotation axis Ax2.

The flexure 43 has an elongated strip shape. Note that the shape of the flexure 43 is not limited to this example. The flexure 43 is, for example, a multi-layer plate including a metal plate (backing layer) such as stainless steel, an insulating layer formed on the metal plate, a conductive layer formed on the insulating layer and having a plurality of wire arrangements (wiring patterns), and a protective layer (insulating layer) covering the conductive layer.

The flexure 43 is attached to the base plate 41 and the load beam 42. The flexure 43 includes a gimbal (elastic support) 46 located above the load beam 42, a first attachment part 47, and a second attachment part 48. The gimbal 46 is an example of a holder.

The gimbal 46 is located between the load beam 42 and the recording surface 12a of the corresponding magnetic disk 12 in the Z direction. The magnetic head 14 is mounted on the gimbal 46. In other words, the gimbal 46 holds the magnetic head 14. The flexure 43 is electrically connected to the magnetic head 14.

The gimbal 46 is supported, for example, by a substantially hemispherical protrusion 49 of the load beam 42 so as to be displaceable and swingable. The magnetic head 14 can thus be displaced and swung together with the gimbal 46.

The gimbal 46 is placed on the flexure 43 between the lift tab 45 and the second rotation axis Ax2 in the radial direction of the second rotation axis Ax2. The magnetic head 14 is also located between the lift tab 45 and the second rotation axis Ax2 in the radial direction of the second rotation axis Ax2.

Bending of the load beam 42 displaces the lift tab in the Z direction, leading to displacing the gimbal 46 and the magnetic head 14 in the Z direction. Note that the gimbal 46 and the magnetic head 14 may not fully follow the displacement of the lift tab 45. For example, the gimbal 46 and the magnetic head 14 may be displaced with a delay from the displacement of the lift tab 45. For another example, when the displacement of the lift tab 45 is within a given range, the gimbal 46 and the magnetic head 14 may not be displaced.

The first attachment part 47 is located between the gimbal 46 and the second rotation axis Ax2 in the radial direction of the second rotation axis Ax2. The second attachment part 48 is located between the lift tab 45 and the gimbal 46 in the radial direction of the second rotation axis Ax2. The first attachment part 47 and the second attachment part 48 are attached to the load beam 42 with, for example, an adhesive.

One end of the FPC 18 in FIG. 1 is connected to the flexure 43. The other end of the FPC 18 is connected to a substrate placed outside the housing 11 via, for example, a connector included in the housing 11. For example, a controller and an interface connector are mounted on the substrate. The controller controls the HDD 10 as a whole. The interface connector is connected to a host computer. The substrate is electrically connected to the magnetic heads 14 via the FPC 18 and the flexures 43.

The ramp load mechanism 17 is placed away from the first rotation axis Ax1 in the radial direction of the first rotation axis Ax1. The ramp load mechanism 17 is also away from the second rotation axis Ax2 in the radial direction of the second rotation axis Ax2.

Figure 3:
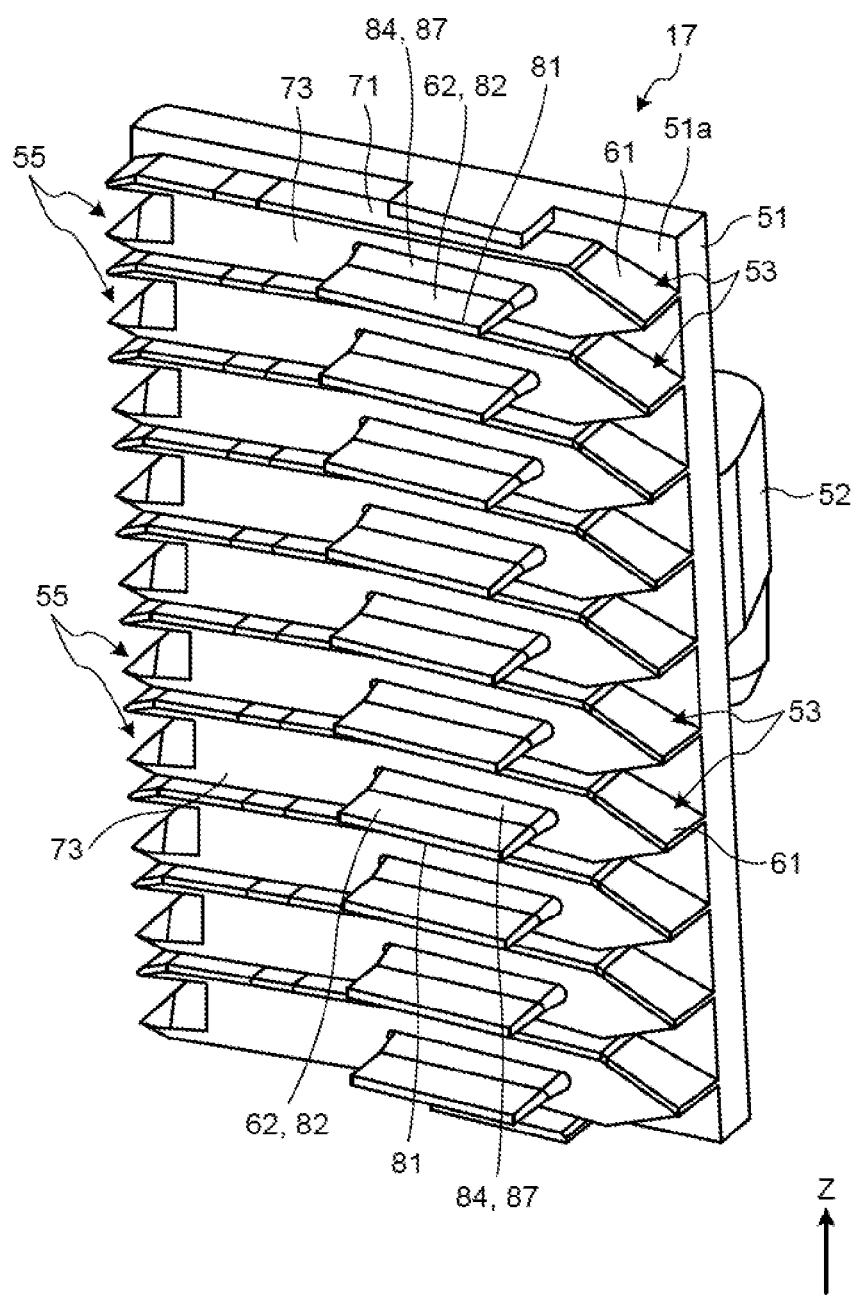
FIG. 3 is an exemplary perspective diagram illustrating a ramp load mechanism of the above embodiment.

FIG. 3 is an exemplary perspective diagram illustrating the ramp load mechanism 17 of the present embodiment. As illustrated in FIG. 3, the ramp load mechanism 17 includes a base 51, an attachment part 52, and a plurality of ramps 53.

The base 51, the attachment part 52, and the ramps 53 are integrally made of a synthetic resin such as polyacetal (POM). Note that the base 51, the attachment part 52, and the ramps 53 may be made individually.

The base 51 has a substantially plate shape extending in the circumferential direction of the second rotation axis Ax2. The base 51 has a side surface 51a. The side surface 51a extends in the circumferential direction of the second rotation axis Ax2 and faces in the inward direction Di. The attachment part 52 protrudes in the outward direction Do from the base 51 and is attached to, for example, the bottom wall 21 of the housing 11.

The plurality of ramps 53 protrudes in the inward direction Di from the side surface 51a of the base 51. The ramps 53 are each provided for two magnetic heads 14 that read and write information to and from two recording surfaces 12a of one magnetic disk 12, and for two actuator assemblies 15 that move the magnetic heads 14. Thus, the ramps 53 are arranged in the Z direction at intervals.

The ramps 53 are located near the outer edges 12b of the corresponding magnetic disks 12. The outer edge 12b of each magnetic disk 12 is inserted into, for example, a groove 55 in the ramp 53. The ramps 53 cover a part of the recording surfaces 12a of the corresponding magnetic disks 12.

Each ramp 53 includes a lifter 61 and a limiter 62. The lifter 61 is an example of a wall. The limiter 62 is an example of a protrusion. The lifter 61 protrudes in the inward direction Di from the side surface 51a of the base 51. As illustrated in FIG. 2, the lifter 61 has two holding surfaces 71 and 72 and a side surface 73. The holding surface 71 is an example of a first support surface.

The holding surface 71 extends in the circumferential direction of the second rotation axis Ax2 and faces in substantially the +Z direction. The holding surface 72 is opposite to the holding surface 71 and faces in substantially the −Z direction. The side surface 73 extends between an end 71a of the holding surface 71 in the inward direction Di and an end 72a of the holding surface 72 in the inward direction Di. The side surface 73 extends in the circumferential direction of the second rotation axis Ax2 and faces in the inward direction Di. Note that the holding surfaces 71 and 72 and the side surface 73 are not limited to this example.

The holding surfaces 71 and 72 can support the lift tab 45 apart from the outer edge 12b in the radial direction of the first rotation axis Ax1. Note that the holding surfaces 71 and 72 may hold the lift tab 45 inside the outer edge 12b in the radial direction of the first rotation axis Ax1.

The lift tab 45 is supported by the holding surface 71 or the holding surface 72 of the ramp 53 as described above while the magnetic head 14 is not reading or writing information to or from the magnetic disk 12 (at the time of unloading). In other words, at the time of unloading, the lift tab 45 is set apart from the outer edge 12b of the magnetic disk 12 in the radial direction of the first rotation axis Ax1. The lift tab 45 at the time of unloading may be located inside the outer edge 12b in the radial direction of the first rotation axis Ax1. In other words, during unloading the lift tab 45 may overlap the recording surface 12a in the axial direction (Z direction) of the first rotation axis Ax1.

While the magnetic head 14 is reading or writing information to or from the magnetic disk 12 (at the time of loading), the lift tab 45 is basically located above the recording surface 12a of the magnetic disk 12 together with the magnetic head 14. In other words, at the time of loading, the recording surface 12a faces the lift tab 45 with spacing. At the time of loading, the lift tab 45 may be at least partially located apart from the recording surface 12a in the radial direction of the first rotation axis Ax1.

Along with the rotation of the actuator assembly 15, the lift tab 45 moves between the region above the recording surface 12a and the position where the lift tab 45 is held by the holding surface 71 or the holding surface (home position). While the lift tab 45 is held by the holding surface 71 or the holding surface 72, the magnetic head 14 is separate from the recording surface 12a of the magnetic disk 12 in the Z direction and in the radial direction of the first rotation axis Ax1. Note that while the lift tab 45 is held by the holding surface 71 or the holding surface 72, the magnetic head 14 may overlap the recording surface 12a in the Z direction.

The lift tab 45 moves (rotates) about the second rotation axis Ax2 in accordance with the rotation of the actuator assembly 15. In the present embodiment, the moving direction of the lift tab 45 approximately matches the radial direction of the first rotation axis Ax1. The lift tab 45 can move approximately in the radial direction of the first rotation axis Ax1 in accordance with the rotation of the actuator assembly 15.

Specifically, the lift tab 45 can move between the vicinity of the first rotation axis Ax1 and the position on the holding surface 71 or the holding surface 72 in the circumferential direction of the second rotation axis Ax2 (radial direction of the first rotation axis Ax1). That is, in the circumferential direction of the second rotation axis Ax2, the lift tab 45 can move toward the first rotation axis Ax1 and away from the holding surface 71 or the holding surface 72 and move away from the first rotation axis Ax1 and toward the holding surface 71 or the holding surface 72.

The actuator assembly 15 including the suspensions 37 rotates about the second rotation axis Ax2 between the load position and the unload position. The load position and unload position refer to angles (positions) about the second rotation axis Ax2.

At the time of loading, the suspension 37 is located in the load position. That is, when the suspension 37 is located in the load position, the magnetic head 14 is located on the recording surface 12a of the magnetic disk 12, and the lift tab 45 is away from the holding surfaces 71 and 72. In the following description, the position of the magnetic head 14 about the second rotation axis Ax2 when the suspension 37 is located in the load position may also be referred to as a load position. The load position is not limited to one position, and includes a plurality of positions of the magnetic head 14 on the recording surface 12a.

At the time of unloading, the suspension 37 is located in the unload position. That is, when the suspension 37 is located in the unload position, the lift tab 45 is held by the holding surface 71 or the holding surface 72 of the ramp 53 to allow the magnetic head 14 to be apart from the recording surface 12a. In the unload position, the lift tab 45 may fit into a recess on the holding surface 71 or 72 and be restricted from moving by the ramp 53. In the following description, the position of the magnetic head 14 about the second rotation axis Ax2 when the suspension 37 is located in the unload position may also be referred to as an unload position.

In the unload position the magnetic head 14 is away from the recording surface 12a in the Z direction. A gap may occur between the magnetic head 14 and the recording surface 12a in the load position. In the Z direction, however, the magnetic head 14 is further away from the recording surface 12a in the unload position than in the load position.

As illustrated in FIG. 3, the limiter 62 protrudes in the inward direction Di from the side surface 73 of the lifter 61. In the Z direction, the limiter 62 is located substantially at the center of the two holding surfaces 71 and 72 of the lifter 61. Note that the position of the limiter 62 is not limited to this example.

The limiter 62 has a plate shape extending in the circumferential direction of the second rotation axis Ax2. The limiter 62 is shorter in length than the lifter 61 in the circumferential direction of the second rotation axis Ax2. Note that the length of the limiter 62 is not limited to this example.

Figure 4:
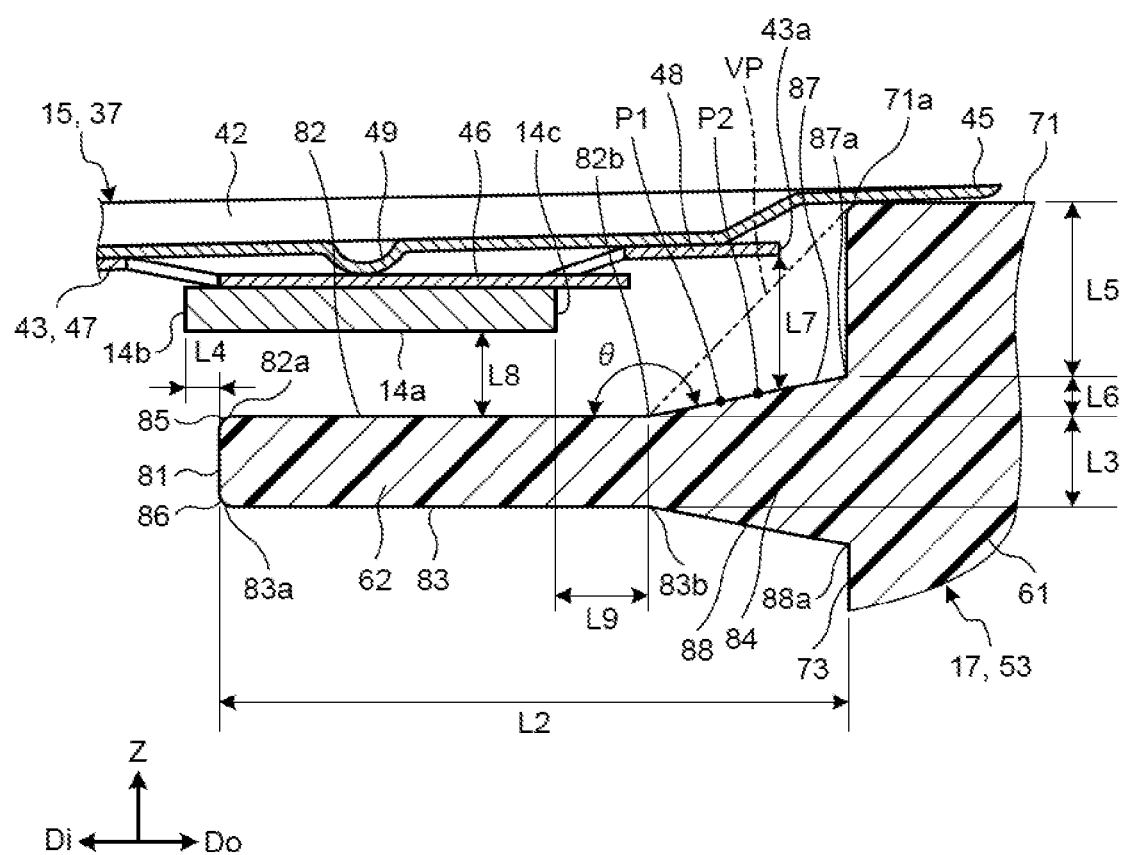
FIG. 4 is an exemplary cross-sectional diagram illustrating a portion of a suspension and a portion of a ramp of the above embodiment.

FIG. 4 is an exemplary cross-sectional diagram illustrating a portion of the suspension 37 and a portion of the ramp 53 of the present embodiment. In FIG. 4 length L2 of the limiter 62 in the radial direction of the second rotation axis Ax2 can be set to 1.89 mm or more and 2.23 mm or less. In the present embodiment, the length L2 is, for example, set to about 2.06 mm. Note that the length L2 is not limited to this example.

The limiter 62 has an end face 81, two receiving surfaces 82 and 83, and an intermediate portion 84. The end face 81 is an example of an end of a protrusion in a radially inward direction of the second rotation axis. The receiving surface 82 is an example of a second support surface. The receiving surface 83 is an example of a third support surface.

The end face 81 is at the end of the limiter 62 in the inward direction Di. The end face 81 faces approximately in the inward direction Di. The end face 81 may face in another direction. The receiving surface 82 extends in the outward direction Do from the end of the end face 81 in the +Z direction. The receiving surface 83 extends in the outward direction Do from the end of the end face 81 in the −Z direction. The receiving surface 83 is opposite to the receiving surface 82.

The receiving surface 82 is substantially flat and faces in substantially the +Z direction. The receiving surface 82 is apart from the holding surface 71 in the −Z direction. The receiving surface 82 faces an air bearing surface (ABS) 14a of the corresponding magnetic head 14 with spacing when the corresponding suspension 37 is located in the unload position. The ABS 14a of the magnetic head 14 faces the recording surface 12a of the magnetic disk 12 in the load position.

The receiving surface 83 is substantially flat and faces in substantially the −Z direction. As illustrated in FIG. 2, the receiving surface 83 is apart from the holding surface 72 in the +Z direction. The receiving surface 83 faces an ABS 14a of the corresponding magnetic head 14 with spacing when the corresponding suspension 37 is located in the unload position.

The receiving surface 82 and the receiving surface 83 extend substantially in parallel with each other. In the radial direction of the second rotation axis Ax2, the receiving surface 82 and the receiving surface 83 have substantially the same length. Note that the receiving surfaces 82 and 83 are not limited to this example.

In FIG. 4 thickness L3, i.e., the distance between the receiving surface 82 and the receiving surface 83 can be set to 0.1 mm or more and 0.55 mm or less. In the present embodiment, the thickness L3 is, for example, set to about 0.22 mm. Note that the thickness L3 is not limited to this example.

When the suspension 37 is located in the unload position, an inflow end 14b of the magnetic head 14 is located more inside than the end face 81 in the radial direction of the second rotation axis Ax2. The inflow end 14b refers to the end of the magnetic head 14 in the inward direction Di. Further, when the suspension 37 is located in the unload position, in the radial direction of the second rotation axis Ax2 the inflow end 14b is located more inside than an end 82a of the receiving surface 82 in the inward direction Di and an end 83a of the receiving surface 83 in the inward direction Di.

In the unload position of the suspension 37, distance L4 between the inflow end 14b and the end face 81 in the radial direction of the second rotation axis Ax2 can be set to 0.15 mm or more and 0.19 mm or less. In the present embodiment, the distance L4 is, for example, set to about 0.17 mm. Note that the distance L4 is not limited to this example.

The end face 81 of the limiter 62 is apart from the magnetic disk 12 in the radial direction of the second rotation axis Ax2. When the suspension 37 is located in the unload position, the inflow end 14b of the magnetic head 14 is located between the end face 81 and the magnetic disk 12 in the radial direction of the second rotation axis Ax2.

As illustrated in FIG. 2, the limiter 62 is placed between the two magnetic heads 14 in the unload position. Vibration of the suspension 37, if it occurs in the Z direction, may cause the receiving surfaces 82 and 83 to come into contact with the ABS 14a of the corresponding magnetic head 14. In this regard the limiter 62 can work to avoid the two magnetic heads 14 from contacting with each other.

The ABS 14a and the receiving surfaces 82 and 83 are substantially flat and substantially in parallel to one another. Thus, the ABS 14a and the receiving surfaces 82 and 83 can contact each other in a wider region, if their contact occurs.

Vibration of the suspension 37 may cause the two magnetic heads 14 to tilt and their inflow ends 14b to approach each other. The thickness L3 and the distance L4 are set to be able to allow the limiter 62 to contact with the magnetic heads 14 to thereby avoid the inflow ends 14b from coming into contact with each other.

As illustrated in FIG. 4, the corner of the end face 81 and the end 82a of the receiving surface 82 is rounded to form a curved surface 85. Likewise, the corner of the end face 81 and the end 83a of the receiving surface 83 is rounded to form a curved surface 86.

The curved surfaces 85 and 86 form a substantially arc-shaped edge in cross-section. The limiter 62 having the curved surfaces 85 and 86 can be prevented from causing damage to a tilted magnetic head 14 when contacting the magnetic head 14.

When the suspension 37 is located in the unload position, in the radial direction of the second rotation axis Ax2 an outflow end 14c of the magnetic head 14 is located more inside than the end 82b of the receiving surface 82 in the outward direction Do. The outflow end 14c refers to the end of the magnetic head 14 in the outward direction Do. Further, when the suspension 37 is located in the unload position, in the radial direction of the second rotation axis Ax2 the outflow end 14c of the magnetic head 14 is located more inside than an end 83b of the receiving surface 83 in the outward direction Do.

The intermediate portion 84 is located between the lifter 61 and the receiving surface 82 in the radial direction of the second rotation axis Ax2. The intermediate portion 84 includes two slopes 87 and 88. The slope 87 is an example of a first inclined surface. The slope 88 is an example of a second inclined surface.

The slope 87 is connected to the end 82b of the receiving surface 82 and the side surface 73 of the lifter 61. The slope 87 extends obliquely with respect to the receiving surface 82. Specifically, the slope 87 extends in the direction between the outward direction Do and the direction (+Z direction) in which the recording surface 12a of the corresponding magnetic disk 12 faces. Thus, in the Z direction an outer portion of the slope 87 in the radial direction of the second rotation axis Ax2 is closer to the holding surface 71.

For example, the slope 87 includes a first portion P1 and a second portion P2. The first portion P1 is a part of the slope 87. The first portion P1 is located between the holding surface 71 and the receiving surface 82 in the Z direction.

The second portion P2 is another part of the slope 87. The second portion P2 is located more outside than the first portion P1 in the radial direction of the second rotation axis Ax2. In the radial direction of the second rotation axis Ax2, the second portion P2 is located between the first portion P1 and the holding surface 71. The second portion P2 is also located between the first portion P1 and the holding surface 71 in the Z direction.

The slope 88 is opposite to the slope 87. The slope 88 is connected to the end 83b of the receiving surface 83 and the side surface 73 of the lifter 61. The slope 88 extends obliquely with respect to the receiving surface 83. Specifically, the slope 88 extends in the direction between the outward direction Do and the direction (−Z direction) in which the recording surface 12a of the corresponding magnetic disk 12 faces. Thus, in the Z direction an outer portion of the slope 88 in the radial direction of the second rotation axis Ax2 is closer to the holding surface 72.

The slope 87 and the slope 88 extend in a tapered manner in the inward direction Di. In other words, the slope 87 and the slope 88 obliquely extend closer to each other in the inward direction Di.

Angle θ between the receiving surface 82 and the slope 87 can be set to 170° or less and equal to or greater than the angle between a virtual plane VP and the receiving surface 82. The virtual plane VP extends between the end 71a of the holding surface 71 and the end 82b of the receiving surface 82. In the present embodiment, the angle θ is, for example, set to about 169°. Note that the angle θ is not limited to this example.

The angle between the receiving surface 83 and the slope 88 is substantially equal to the angle θ. Thus, the limiter 62 is mirror-symmetric in shape in the Z direction. Note that the angle between the receiving surface 83 and the slope 88 may be different from the angle θ.

In the Z direction, an end 87a of the slope 87 in the outward direction Do is closer to the holding surface 71 than to the receiving surface 82. The end 87a is an example of an end of an intermediate portion in a radially outward direction of the second rotation axis. In the Z direction, an end 88a of the slope 88 in the outward direction Do is closer to the holding surface 72 than to the receiving surface 83.

From the above, in the limiter 62, the cross-sectional area of the connect portion between the lifter 61 and the intermediate portion 84 is larger than the cross-sectional area of the tip (end face 81) of the limiter 62. The cross-sectional area refers to the area of the cross-section orthogonal to the direction in which the limiter 62 extends. In other words, the limiter 62 is thicker in thickness at one end connected to the lifter 61 than at the other end.

The intermediate portion 84 may have another surface that can include the first portion and the second portion instead of the slopes 87 and 88. For example, the intermediate portion 84 may have a surface with two or more steps instead of the slopes 87 and 88. The first portion may be located on a lower step of the stepped surface. The second portion may be located on a higher step of the stepped surface.

In the Z direction, distance L5 between the end 87a of the slope 87 and the holding surface 71 is longer than distance L6 between the end 87a of the slope 87 and the receiving surface 82. In the present embodiment, the distance L5 is, for example, set to about 0.60 mm. The distance L6 is, for example, set to about 0.1875 mm. In this case the maximum thickness of the intermediate portion 84 in the Z direction is about 0.545 mm since the shape of the limiter 62 is mirror-symmetrical. Note that the distances L5 and L6 are not limited to this example.

When the suspension 37 is located in the unload position, the slope 87 faces an end 43a of the flexure 43 in the outward direction Do with spacing. The end 43a can also be referred to as a TE limiter.

When the suspension 37 is located in the unload position, distance L7 between the end 43a of the flexure 43 and the limiter 62 is longer than distance L8 between the magnetic head 14 and the receiving surface 82 in the Z direction. Because of this, when vibration of the suspension 37 in the Z direction causes the magnetic head 14 to contact with the receiving surface 82, the end 43a of the flexure 43 is apart from the limiter 62.

In the radial direction of the second rotation axis Ax2, distance L9 between the outflow end 14c of the magnetic head 14 and the end 82b of the receiving surface 82 can be set to 0 mm or more. In the present embodiment, the distance L9 is, for example, set to 0.16 mm. Note that the distance L9 is not limited to this example. The distance L9 matches the distance between the outflow end 14c and the intermediate portion 84 in the radial direction of the second rotation axis Ax2.

In the radial direction of the second rotation axis Ax2, the distance between the second rotation axis Ax2 and the end face 81 can be, for example, set to about 46.97 mm. In the radial direction of the second rotation axis Ax2, the distance between the second rotation axis Ax2 and the end 82b of the receiving surface 82 can be, for example, set to about 48.33 mm. In this case the distance between the end face 81 and the end 82b of the receiving surface 82 along the second rotation axis Ax2 is about 1.36 mm. The distance between the second rotation axis Ax2 and the side surface 73 is, for example, set to 49.03 mm. Note that the above dimensions are merely exemplary.

The ramp load mechanism 17 is manufactured by, for example, injection molding. In injection molding, the material flows from the lifter 61 toward the end face 81 at the tip of the limiter 62 in the mold cavity. That is, the material flows from a wider space for forming the lifter 61 to a narrower space for forming the limiter 62.

For example, to form the limiter 62 of a thin constant thickness, the material may not easily flow deep into the space for forming the limiter 62. In the present embodiment, however, the intermediate portion 84 extends in a tapered form from the side surface 73 of the lifter 61. Due to such a tapered form of the intermediate portion 84, the material can easily flow from the space for forming the lifter 61 into the space for forming the intermediate portion 84.

In comparison with the limiter 62 of a constant thickness, the material can more easily flow deep into the space for forming the limiter 62 including such a tapered-form intermediate portion 84. Consequently, the ramp load mechanism 17 of the present embodiment can contribute to reducing the occurrence of manufacturing failure in injection molding. Note that the ramp load mechanism 17 may be manufactured by another manufacturing method.

In the HDD 10 according to the present embodiment described above, each suspension 37 includes the load beam 42, the lift tab 45, the flexure 43, and the gimbal 46. The load beam 42 extends in the radial direction of the second rotation axis Ax2. The lift tab 45 is located at the end of the load beam 42 in the outward direction Do. The flexure 43 is attached to the load beam 42. The gimbal 46 is placed on the flexure 43 between the lift tab 45 and the second rotation axis Ax2 in the radial direction of the second rotation axis Ax2, to hold the magnetic head 14. The suspension 37 rotates about the second rotation axis Ax2 between the load position where the lift tab 45 is apart from the ramp 53 and the magnetic head 14 is located on the recording surface 12a and the unload position where the lift tab 45 is held by the ramp 53. The ramp 53 includes the lifter 61 and the limiter 62 protruding from the lifter 61 in the inward direction Di. The lifter 61 has the holding surface 71 that supports the lift tab 45 of the suspension 37 in the unload position. The limiter 62 has the receiving surface 82 and the intermediate portion 84. The receiving surface 82 is apart from the holding surface 71 in the Z direction and faces the magnetic head 14 when the suspension 37 is located in the unload position. The intermediate portion 84 is located between the lifter 61 and the receiving surface 82 in the radial direction of the second rotation axis Ax2. In the unload position of the suspension 37, the distance L7 between the end 43a of the flexure 43 in the outward direction Do and the limiter 62 is longer than the distance L8 between the magnetic head 14 and the receiving surface 82 in the Z direction. When the suspension 37 vibrates in the Z direction, the receiving surface 82 of the limiter 62 comes into contact with the magnetic head 14 but is unlikely to contact with the end 43a of the flexure 43. The limiter 62 of the present embodiment can therefore omit the portion to receive the end 43a of the flexure 43 of the suspension 37 when vibrating. This makes it possible to decrease the thickness of the limiter 62 in the ramp 53 of the present embodiment, which allows the ramp 53 to include the limiter 62 irrespective of narrower intervals L1 between the magnetic disks 12 arranged. From another point of view, to form the limiter 62 of a thin thickness by, for example, injection molding, it may be difficult to supply the material to the area to become the tip (end face 81) of the limiter 62. However, in the present embodiment, the intermediate portion 84 includes the first portion P1 located between the holding surface 71 and the receiving surface 82 in the Z direction, and the second portion P2 located between the first portion P1 and the holding surface 71 in the Z direction and in the radial direction of the second rotation axis Ax2. That is, the intermediate portion 84 has a shape such that it increases in thickness gradually or in a stepwise manner toward the lifter 61 having the holding surface 71. According to the HDD 10 of the present embodiment, it is therefore made possible to easily supply the material to the area to become the tip of the limiter 62 in, for example, injection molding, which can abate difficulty in manufacturing the ramp 53 including the limiter 62 of a thin thickness.

The intermediate portion 84 includes the slope 87 that is connected to the receiving surface 82 and extends obliquely with respect to the receiving surface 82. The slope 87 includes the first portion P1 and the second portion P2. That is, the intermediate portion 84 gradually increases in thickness toward the lifter 61 having the holding surface 71. Because of this, at the time of injection molding, for example, the material can be easily supplied to the area to become the tip of the limiter 62, leading to facilitating manufacture of the ramp 53.

The limiter 62 further has the receiving surface 83 opposite to the receiving surface 82, and the slope 88 connected to the receiving surface 83 and extending obliquely with respect to the receiving surface 83. The slope 87 and the slope 88 are tapered in the inward direction Di. That is, the slope 87 and the slope 88 are tapered toward the tip of the limiter 62. Thus, at the time of injection molding, for example, the material can be easily supplied to the area to become the tip of the limiter 62, leading to facilitating manufacture of the ramp 53.

When the suspension 37 is located in the unload position, the inflow end 14b of the magnetic head 14 is located more inside than the end face 81 of the limiter 62 in the radial direction of the second rotation axis Ax2. This makes it possible to avoid the inflow end 14b of the magnetic head 14 from colliding with the limiter 62 when the suspension 37 vibrates in the Z direction. This further enables the limiter 62 to be relatively short in length, facilitating forming of the limiter 62.

When the suspension 37 is located in the unload position, in the radial direction of the second rotation axis Ax2 the outflow end 14c of the magnetic head 14 is located more inside than the end 82b of the receiving surface 82 in the outward direction Do. This makes it possible to avoid the outflow end 14c of the magnetic head 14 from colliding with the intermediate portion 84 when the suspension 37 vibrates in the Z direction.

In the Z direction, the distance L5 between the end 87a of the intermediate portion 84 and the holding surface 71 in the outward direction Do is longer than the distance L6 between the end 87a of the intermediate portion 84 and the receiving surface 82 in the outward direction Do. This makes the intermediate portion 84 relatively smaller in size in the Z direction, so that the intermediate portion 84 can be avoided from interfering with the suspension 37.

In the above description, suppression is defined as, for example, preventing the occurrence of an event, action, or effect, or reducing the degree of event, action, or effect. Further, in the above description, restriction is defined as, for example, preventing movement or rotation, or allowing movement or rotation within a predetermined range and preventing movement or rotation beyond the predetermined range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A disk device comprising:
a plurality of magnetic disks each of which has a recording surface and is rotatable about a first rotation axis intersecting the recording surface;
a magnetic head configured to read and write information to and from the recording surface;
a ramp placed apart from the first rotation axis; and
a suspension including
a load beam extending in a radial direction of a second rotation axis,
a sliding portion located at an end of the load beam in a radially outward direction of the second rotation axis,
a flexure attached to the load beam, and
a holder placed on the flexure between the sliding portion and the second rotation axis in the radial direction of the second rotation axis, to hold the magnetic head,
the suspension configured to rotate about the second rotation axis between a load position and an unload position, the load position being a position where the sliding portion is apart from the ramp and the magnetic head is located on the recording surface, the unload position being a position where the sliding portion is held by the ramp, wherein
the ramp includes a wall and a protrusion protruding inward from the wall in the radial direction of the second rotation axis,
the wall has a first support surface that supports the sliding portion when the suspension is located in the unload position, the protrusion includes
  a second support surface apart from the first support surface in an axial direction of the first rotation axis and facing the magnetic head when the suspension is located in the unload position, and
  an intermediate portion located between the wall and the second support surface in the radial direction of the second rotation axis,
when the suspension is located in the unload position, in the axial direction of the first rotation axis, a distance between an end of the flexure in the radially outward direction of the second rotation axis and the protrusion is longer than a distance between the magnetic head and the second support surface, and
the intermediate portion includes
  a first portion located between the first support surface and the second support surface in the axial direction of the first rotation axis, and
  a second portion located at a different position from the first portion in the axial direction of the first rotation axis, the second portion located between the first portion and the first support surface in the axial direction of the first rotation axis and in the radial direction of the second rotation axis.

2. The disk device according to claim 1, wherein
the intermediate portion has a first inclined surface connected to the second support surface and extending obliquely with respect to the second support surface, and
the first inclined surface includes the first portion and the second portion.

3. The disk device according to claim 2, wherein
the protrusion further has a third support surface opposite to the second support surface, and a second inclined surface connected to the third support surface and extending obliquely with respect to the third support surface, and
the first inclined surface and the second inclined surface extend inward in a tapered manner in the radial direction of the second rotation axis.

4. The disk device according to claim 3, wherein
a distance between the plurality of magnetic disks is set to 1.482 mm or less, and
a distance between the second support surface and the third support surface is set to 0.1 mm or more and 0.55 mm or less.

5. The disk device according to claim 2, wherein
an angle between the second support surface and the first inclined surface is set to 170° or less and equal to or greater than an angle between a virtual plane and the second support surface, the virtual plane extending between an end of the first support surface in a radially inward direction of the second rotation axis and an end of the second support surface in the radially outward direction of the second rotation axis.

6. The disk device according to claim 1, wherein
when the suspension is located in the unload position, in the radial direction of the second rotation axis, a radially inward end of the magnetic head is located more inside than a radially inward end of the protrusion.

7. The disk device according to claim 6, wherein
when the suspension is located in the unload position, in the radial direction of the second rotation axis, a distance between the radially inward end of the magnetic head and the radially inward end of the protrusion is set to 0.15 mm or more and 0.19 mm or less.

8. The disk device according to claim 1, wherein
when the suspension is located in the unload position, in the radial direction of the second rotation axis, a radially outward end of the magnetic head is located more inside than a radially outward end of the second support surface.

9. The disk device according to claim 1, wherein
in the axial direction of the first rotation axis, a distance between an end of the intermediate portion in the radially outward direction of the second rotation axis and the first support surface is longer than a distance between the end of the intermediate portion in the radially outward direction of the second rotation axis and the second support surface.

10. The disk device according to claim 1, wherein
in the radial direction of the second rotation axis the protrusion has a length of 1.89 mm or more and 2.23 mm or less.

11. The disk device according to claim 1, wherein
when the suspension is located in the unload position, in the radial direction of the second rotation axis, a radially inward end of the magnetic head is located between a radially inward end of the protrusion and the plurality of magnetic disks.

\* \* \* \* \*